United States Patent [19]

Plinta

[11] Patent Number: 5,528,849
[45] Date of Patent: Jun. 25, 1996

[54] CAMOUFLAGE TUBE, A PORTABLE CAMOUFLAGE CONCEALMENT STRUCTURE

[76] Inventor: Charles Plinta, 2913 Waidler Ave., Pittsburgh, Pa. 15227

[21] Appl. No.: 402,198

[22] Filed: Mar. 10, 1995

[51] Int. Cl.⁶ .......................... A01M 31/00; E04H 15/04
[52] U.S. Cl. .................. 43/1; 135/90; 135/126; 135/901
[58] Field of Search ............. 43/1; 135/90, 901, 135/902, 126, 125, 128, 143, 117; D 22/199

[56] References Cited

U.S. PATENT DOCUMENTS

| | | | |
|---|---|---|---|
| 645,890 | 3/1900 | Conrad | 135/901 x |
| 3,288,157 | 11/1966 | Szkolny | 135/901 X |
| 3,540,170 | 11/1970 | Flowers | 43/1 |
| 3,913,598 | 10/1975 | Glutting, Jr. et al. | 43/1 X |
| 4,825,578 | 5/1989 | Robinson | 135/901 X |

FOREIGN PATENT DOCUMENTS 301710  12/1928  United Kingdom ................. 135/902

Primary Examiner—J. Elpel

[57] ABSTRACT

A camouflage tube, a portable camouflage concealment structure for use by hunters and bird watchers and nature photographers is disclosed. The invention has a plurality of hoops in an axial spaced apart relationship that forms an upstanding open ended tube. A mesh panel is disposed between a topmost hoop and an intermediate hoop and is in stitched communication with the topmost hoop. A camouflage panel is disposed below the mesh panel and is in stitched communication therewith. A plurality of straps attached to the topmost hoop urge removable communication with a branch of a tree or the like. Finally, a plurality of arcuate loops are disposed on an inner side of the apparatus and are in stitched communication with the camouflage panel and friction communication with the intermediate hoop.

3 Claims, 3 Drawing Sheets

CAMOUFLAGE TUBE, A PORTABLE CAMOUFLAGE CONCEALMENT STRUCTURE

BACKGROUND OF THE INVENTION

1. Field of the Invention

The present invention relates to a new and improved a camouflage tube, a portable camouflage concealment structure and, more particularly, pertains to a portable concealment structure for photographers and hunters and bird watchers for allowing movement by the observer within the structure while still maintaining the concealment and allowing the observer to have full 360° vision from his position inside the structure.

2. Description of the Prior Art

The use of complex and difficult-to-deploy concealment structures is known in the prior art. More specifically, complex and difficult-to-deploy concealment structures heretofore devised and utilized having many parts and being difficult to operate and maintain in conditions typically found in outdoor situations requiring concealment effects and in particular, maintaining the visual concealment effect while allowing movement of the observer within the structure are known to consist basically of familiar, expected, and obvious structural configurations, notwithstanding the myriad of designs encompassed by the crowded prior art which has been developed for the fulfillment of countless objectives and requirements.

The prior art discloses a large number of complex and difficult-to-deploy concealment structures. By way of example, U.S. Pat. No. 5,301,706 issued to Jones discloses a portable self-contained blind to conceal a hunter or a photographer.

U.S. Pat. No. 4,794,717 issued to Horsmann discloses a portable hunting blind structure adapted for hunting ducks and geese wherein the blind is arranged to resemble a bale of hay.

U.S. Pat. No. 4,581,837 issued to Powlus discloses a hunter's blind having a shape of a feeding goose to attract wild geese to the blind.

U.S. Pat. No. 4,449,542 issued to McSwain et al. discloses a hunting blind assembly having a collapsible umbrella roof structure and a plurality of polygonal side body panels.

U.S. Pat. No. 4,388,939 issued to Barton discloses a portable knock-down duck blind having a frame formed of a plurality of arcuate shaped metal tubes adapted to support a removable waterproof fabric cover.

U.S. Pat. No. 334,627 issued to Morris appears to disclose an inflatable hunting blind having a roof structure.

In this respect, the camouflage tube, the portable camouflage concealment structure according to the present invention substantially departs from the conventional concepts and designs of the prior art, and in doing so provides an apparatus primarily developed for the purpose of providing a portable concealment structure for photographers and hunters and bird watchers.

OBJECTS OF THE INVENTION

It is therefore an object of the present invention to provide a new and improved camouflage tube, a portable camouflage concealment structure which has all the advantages of the prior art concealment structures and none of the disadvantages.

It is another object of the present invention to provide a new and improved camouflage tube, a portable camouflage concealment structure which may be easily and efficiently manufactured and marketed.

It is a further object of the present invention to provide a new and improved camouflage tube, a portable camouflage concealment structure which is of a durable and reliable construction.

An even further object of the present invention is to provide a new and improved camouflage tube, a portable camouflage concealment structure which is susceptible of a low cost of manufacture with regard to both materials and labor, and which accordingly is then susceptible of low prices of sale to the consuming public, thereby making such a camouflage tube, a portable camouflage concealment structure economically available to the buying public.

Still yet another object of the present invention is to provide a new and improved camouflage tube, a portable camouflage concealment structure which provides in the apparatuses and methods of the prior art some of the advantages thereof, while simultaneously overcoming some of the disadvantages normally associated therewith.

Even still another object of the present invention is to provide a portable concealment structure for photographers and hunters and bird watchers for allowing movement by the observer within the structure and still maintaining the concealment while allowing the observer to have full 360° vision from his position inside the structure.

Lastly, it is an object of the present invention to provide a portable concealment structure for use by hunters and bird watchers and nature photographers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Therefore, it can be appreciated that there exists a continuing need for a new and improved camouflage tube, a portable camouflage concealment structure which can be used by photographers and hunters and bird watchers for allowing movement by the observer within the structure and still maintaining the concealment while allowing the observer to have full 360° vision from his position inside the structure In this regard, the present invention substantially fulfills this need.

SUMMARY OF THE INVENTION

In view of the foregoing disadvantages inherent in the known types of complex and difficult-to-deploy concealment structures now present in the prior art, the present invention provides a new and improved camouflage tube, a portable camouflage concealment structure. As such, the general purpose of the present invention, which will be described subsequently in greater detail, is to provide a new and improved camouflage tube, a portable camouflage concealment structure and methods which have all the advantages of the prior art and none of the disadvantages.

To attain this, the present invention essentially comprises a portable concealment structure for use by hunters and bird watchers and nature photographers. The invention has a plurality of hoops in an axial spaced apart relationship that forms an upstanding open ended tube. A mesh panel is disposed between a topmost hoop and an intermediate hoop and is in stitched communication with the topmost hoop. The mesh panel further has an arcuate orientation that allows the person therein to observe the area outside the concealment structure through the mesh panel. A camouflage panel is disposed below the mesh panel and is in stitched communication therewith. The camouflage panel is in friction communication with the intermediate hoop and in stitched communication with the a lowermost hoop that conceals the person therein from animals and birds outside the structure.

A plurality of straps attached to the topmost hoop urge removable communication with a branch of a tree or the like. Each strap has an end adapted for hook and loop communication with an end of another strap. Finally, a plurality of arcuate loops are disposed on an inner side of the apparatus in stitched communication therewith and have an inner side in friction communication with the intermediate hoop that urges the hoop to remain in a constant position.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 discloses the mesh panel in stitched communication with the uppermost tube and being in stitched communication with the camouflage panel therebelow.

FIG. 4 discloses the intermediate hoop in friction communication with a plurality of arcuate loops sewn in the camouflage panel and holding the intermediate hoop.

FIG. 5 is a perspective illustration disclosing the invention deployed in a horizontal position for duck hunting or water fowl hunting or the like.

The same reference numerals refer to the same parts throughout the various Figures.

DESCRIPTION OF THE PREFERRED EMBODIMENT

Figure 1:
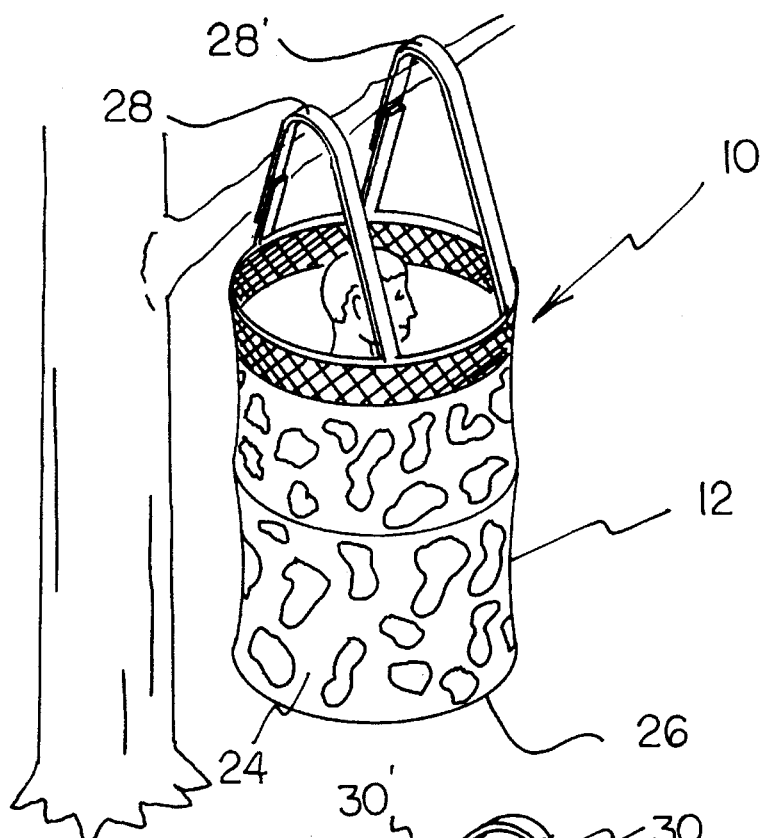
FIG. 1 is a perspective illustration of the preferred embodiment of the camouflage tube, a portable camouflage concealment structure constructed in accordance with the principles of the present invention.
Figure 2:
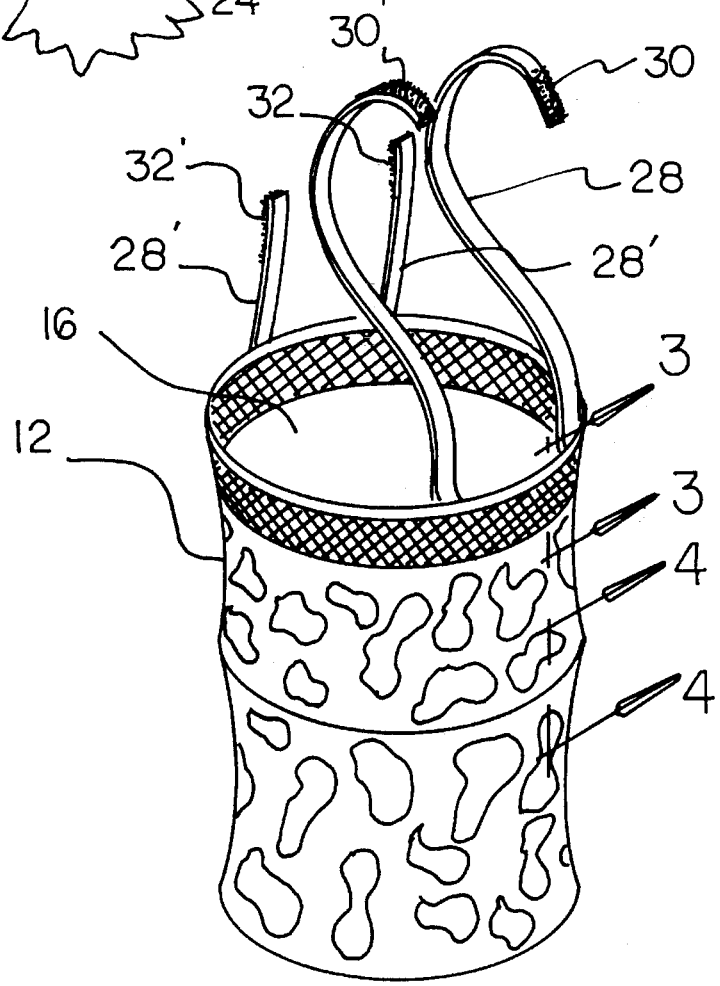
FIG. 2 is a perspective illustration of the invention disclosing the mesh panel in stitched communication with the camouflage panel therebelow and the plurality of straps attached to a topmost hoop for removable hook and loop communication.
Figure 3:
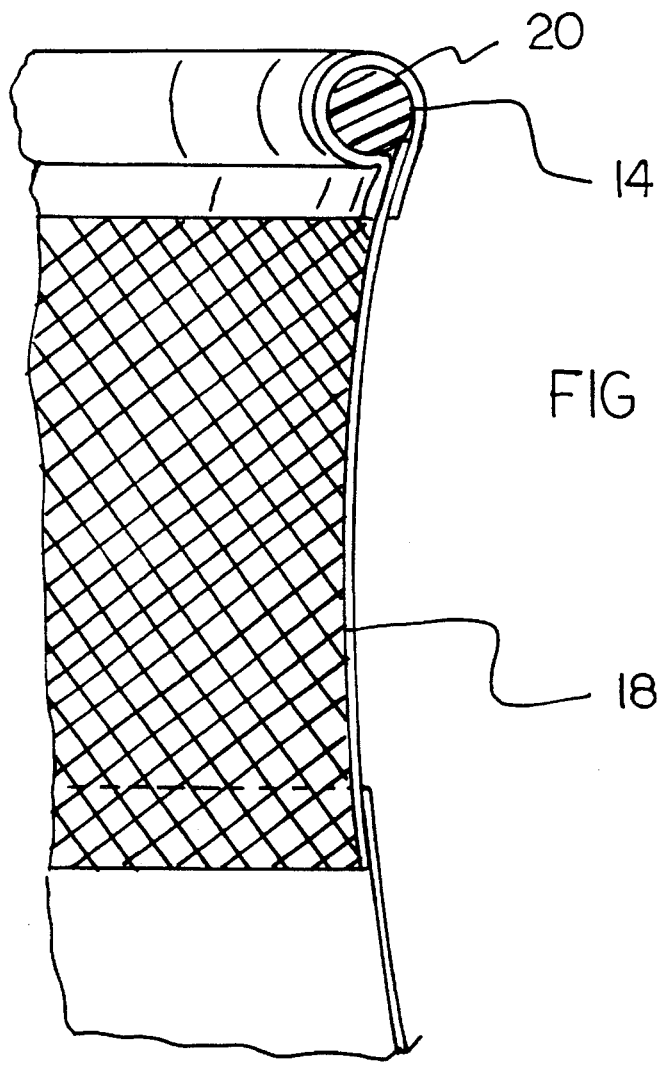
FIG. 3 is a vertical cross-sectional view of the invention taken along viewing lines 3—3 in FIG. 2.
Figure 4:
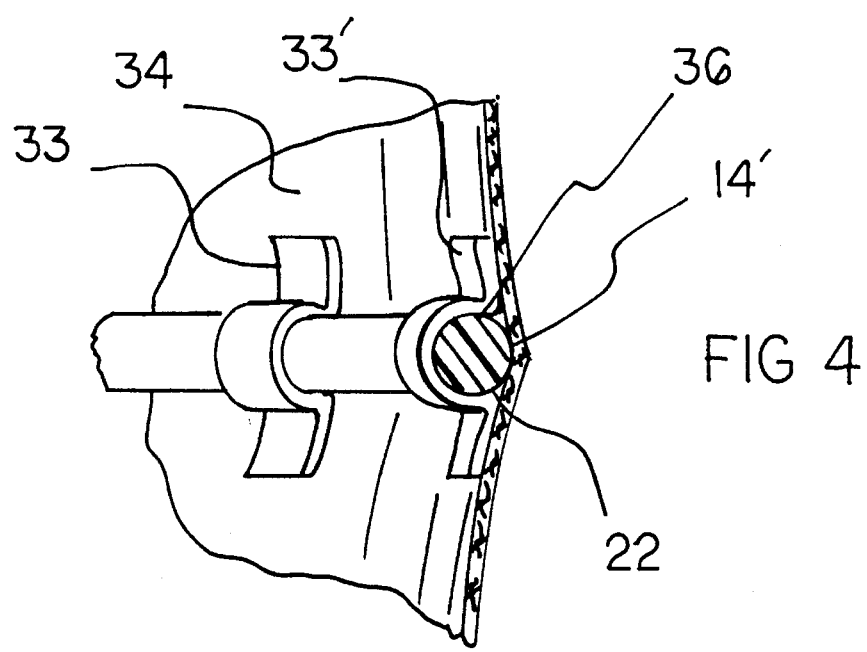
FIG. 4 is a vertical cross-sectional view of the invention taken along viewing lines 4—4 in FIG. 2.
Figure 5:
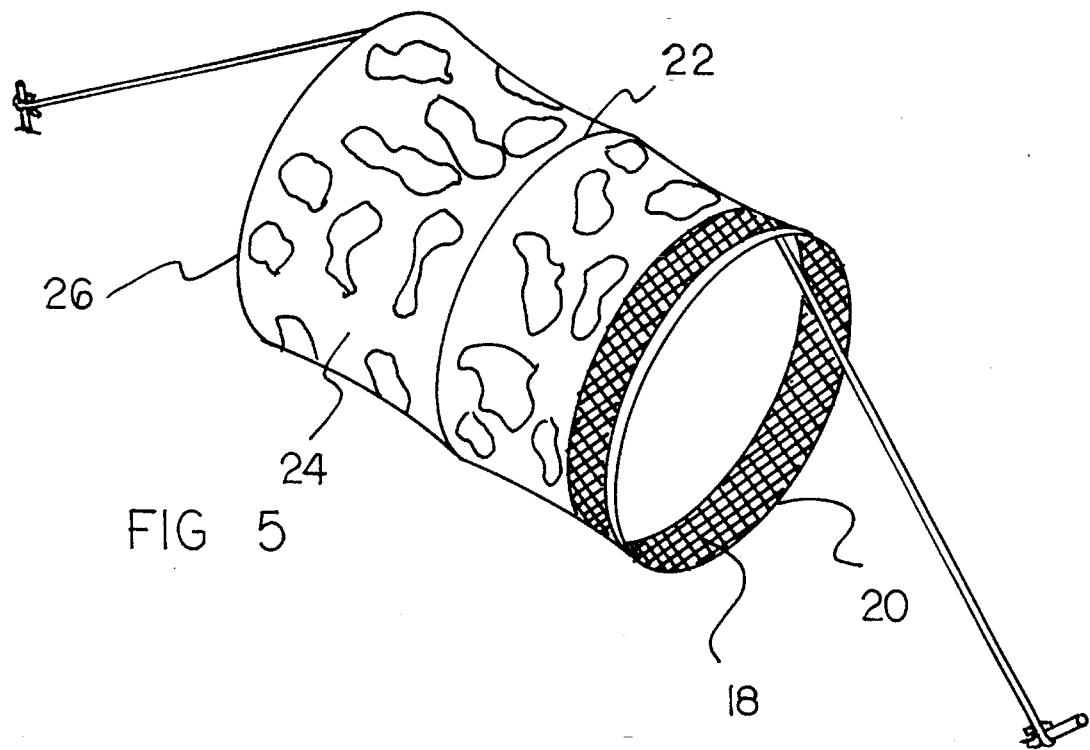
Figure 6:
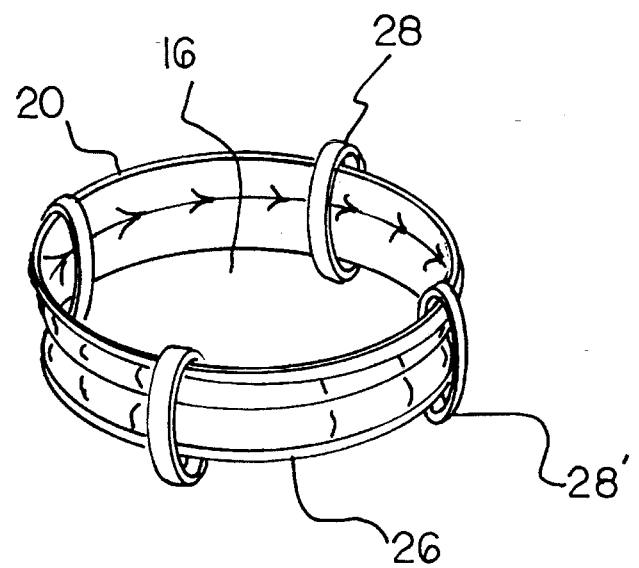
FIG. 6 is a perspective illustration of the invention in the collapsed status showing the straps in hook and loop fastening communication for movement of the invention to another location.

With reference now to the drawings, and in particular to FIGS. 1 through 6 thereof, the preferred embodiment of the new and improved portable camouflage tube, a camouflage concealment structure embodying the principles and concepts of the present invention and generally designated by the reference numeral 10 will be described.

The present invention, the new and improved camouflage tube, a portable camouflage concealment structure, is a system comprised of a plurality of components. The components in their broadest context include a mesh panel, a camouflage panel, a plurality of hoops, and a plurality of straps. Each of the individual components is specifically configured and correlated one with respect to the other to attain the desired objectives. The invention is a structure that is a substitute for camouflage clothing that has to be worn in the field when hunting or doing bird watching or animal photography or the like. The invention comprises a plurality of tubular plastic rings and has an upper level see-through arcuate mesh panel for 360° visibility of the surroundings. An arcuate camouflage cloth panel is attached to a lower edge of the mesh and attached to the intermediate and lowermost ring for concealing the observer therein.

Referring generally to FIG. 1, the invention 10 comprises a new and improved portable concealment structure 12 for use by hunters and bird watchers and nature photographers to conceal their position in the structure 12. A plurality of hoops 14,14' area disposed in an axial spaced apart relationship that form an upstanding open ended tube 16. A mesh panel 18 is disposed between a topmost hoop 20 and an intermediate hoop 22 and is in stitched communication with the topmost hoop 20. The mesh panel 18 further has an arcuate orientation for allowing the person therein to observe the area outside the concealment structure 12 through the mesh panel 18 in a full 360° circle.

A camouflage panel 24 is disposed below the mesh panel 18 and is in stitched communication therewith. The camouflage panel 24 is in stitched communication with a lowermost hoop 26 and in friction communication with the intermediate hoop 22. The camouflage panel 24 conceals the person therein from animals and birds outside the structure 12.

A plurality of straps 28, 28' are attached to the topmost hoop 20 for urging removable communication with a branch of a tree or the like. Each strap 28 has an end 30 adapted for hook and loop communication with an end 32 of another strap 28'. A plurality of arcuate retaining loops 33, 33' are disposed on an inner side 34 of the structure 12 and are in stitched communication therewith. Each loop 33 has an inner side 36 in friction communication with the intermediate hoop 22 for urging the hoop 22 to remain in a constant position. It should be understood that the straps 28,28' may be formed at their ends with other types of fastening devices including elongated straps which may simply be tied together to couple the straps for forming loops positionable around a tree part such as a limb as described hereinbelow. The straps may also be tied around other objects including the trunk of a tree if desired as a function of the particular location and situation.

In use and operation the structure 12 is merely placed on any suitable surface and the person steps inside the tube 16, grasps the top hoop 20 and lifts the top hoop 20 to the desired height. Then the person takes the attachment straps 28,28' and couples them to a horizontal object such as an existing overhead tree limb or branch or the like by using the hook and loop or other fasteners or by tieing together the strap ends. The straps may be coupled over the tree limb as shown or, in an alternate embodiment, the straps may be coupled around a vertical object such as a tree trunk thereby having the device depend from its straps while resting on the side of the tree trunk. The observer is then free to perform his function inside the structure 12 without detection. When the observer is finished using the structure 12, he merely reverses the process and detaches the straps 28,28' from the overhead tree limb, grasps the top hoop 20 and turns the top hoop 20 in a clockwise or counterclockwise direction and the structure 12 collapses to a size that is easily portable. The straps 28,28' are then used to secure the three hoops 20,22,26 and the panels 18,24 therein in an easily portable unit. A preferred embodiment of the invention 10 would have a three foot diameter and approximately five foot height for the camouflage panel 24 and a one foot height for the mesh panel 18.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable canouflage concealment tube structure comprising:

a plurality of hoops in an axial spaced-apart relationship for forming an upstanding open ended tube;

a mesh panel disposed between a topmost hoop and an intermediate hoop and in stitched communication with the topmost hoop, the mesh panel further having an arcuate orientation for allowing a user therein to observe the area outside the concealment structure through the mesh panel a full 360°;

a camouflage panel disposed below the mesh panel and in stitched communication therewith, the camouflage panel further being in arcuate communication and stitched communication with the intermediate hoop and a lowermost hoop for concealing the user therein from animals and birds outside the structure;

a plurality of straps attached to the topmost hoop for urging removable communication with a branch of a tree or like structure, each strap having an end adapted for hook and loop communication with an end of another strap; and a plurality of arcuate loops disposed on an inner side of the camouflage panel in stitched communication therewith and, further having an inner side in friction communication with the intermediate hoop for urging the hoop to remain in a constant position.

2. A portable camouflage concealment tube structure, comprising: a plurality of hoops in an axial spaced apart relationship for forming an upstanding open ended tube, a mesh panel disposed between a topmost hoop and an intermediate hoop and in stitched communication with the topmost hoop, a camouflage panel disposed below the mesh panel and in stitched communication therewith, a plurality of straps attached to the topmost hoop for urging removable communication with a part of a tree or like structure, each strap including an end adapted for hook and loop communication with an end of another step, and a plurality of arcuate loops disposed on an inner side of the camouflage panel in stitched communication with the camouflage panel.

3. A portable concealment tube structure as recited in claim 2 wherein the overall height of the structure is about between 5 to 7 feet high.

\* \* \* \* \*